United States Patent
Ansaloni et al.

(10) Patent No.: US 9,330,005 B2
(45) Date of Patent: May 3, 2016

(54) INTERFACE AND METHOD FOR INTER-THREAD COMMUNICATION

(71) Applicant: INTERNATIONAL BUSINESS MACHINES CORPORATION, Armonk, NY (US)

(72) Inventors: Danilo Ansaloni, Lugano (CH); Yiyu L. Chen, Rueschlikon (CH); Patricia M. Sagmeister, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 13/711,072

(22) Filed: Dec. 11, 2012

(65) Prior Publication Data

US 2013/0151783 A1 Jun. 13, 2013

(30) Foreign Application Priority Data

Dec. 13, 2011 (EP) .................................. 11193297

(51) Int. Cl.
*G06F 12/08* (2006.01)

(52) U.S. Cl.
CPC .......... *G06F 12/084* (2013.01); *G06F 12/0897* (2013.01)

(58) Field of Classification Search
CPC ........................... G06F 12/084; G06F 12/0897
See application file for complete search history.

(56) References Cited

U.S. PATENT DOCUMENTS

| | | | | |
|---|---|---|---|---|
| 6,665,704 B1* | 12/2003 | Singh | ............................ | 719/330 |
| 8,621,184 B1* | 12/2013 | Radhakrishnan et al. | .... | 712/220 |
| 2004/0158819 A1* | 8/2004 | Cuomo et al. | ................ | 717/128 |
| 2007/0261057 A1* | 11/2007 | Dearth et al. | ................. | 718/104 |
| 2008/0120622 A1* | 5/2008 | Follis et al. | .................... | 718/105 |
| 2009/0106495 A1 | 4/2009 | Chou | | |
| 2009/0144505 A1* | 6/2009 | Auernhammer et al. | ..... | 711/128 |
| 2009/0157961 A1* | 6/2009 | Gregg et al. | .................. | 711/118 |
| 2009/0157966 A1* | 6/2009 | Gregg et al. | .................. | 711/122 |
| 2009/0198891 A1* | 8/2009 | Arimilli et al. | ............... | 711/118 |
| 2010/0131720 A1 | 5/2010 | Harper, III et al. | | |
| 2010/0169895 A1 | 7/2010 | Dice et al. | | |
| 2010/0185819 A1* | 7/2010 | Heil et al. | ...................... | 711/135 |
| 2010/0205379 A1* | 8/2010 | Auernhammer | .............. | 711/146 |

(Continued)

OTHER PUBLICATIONS

Jahre, Magnus. "Interprocessor Communication in Chip Multiprocessors." Project Report, Norwegian U. of Sci. & Tech. Spring 2006.*

(Continued)

*Primary Examiner* — Kevin Verbrugge
*Assistant Examiner* — Candice Rankin
(74) *Attorney, Agent, or Firm* — Tutunjian & Bitetto, P.C.; Jennifer R. Davis

(57) ABSTRACT

The interface for inter-thread communication between a plurality of threads including a number of producer threads for producing data objects and a number of consumer threads for consuming the produced data objects includes a specifier and a provider. The specifier is configured to specify a certain relationship between a certain producer thread of the number of producer threads which is adapted to produce a certain data object and a consumer thread of the number of consumer threads which is adapted to consume the produced certain data object. Further, the provider is configured to provide direct cache line injection of a cache line of the produced certain data object to a cache allocated to the certain consumer thread related to the certain producer thread by the specified certain relationship.

13 Claims, 9 Drawing Sheets

(56) References Cited

U.S. PATENT DOCUMENTS

| | | |
|---|---|---|
| 2010/0223431 A1 | 9/2010 | Nishihara |
| 2010/0332755 A1 | 12/2010 | Bu et al. |
| 2012/0215982 A1* | 8/2012 | Bell et al. ............... 711/119 |
| 2012/0265968 A1* | 10/2012 | Sweeney et al. ............ 712/219 |
| 2013/0014118 A1* | 1/2013 | Jones ........................ 718/104 |
| 2013/0067160 A1* | 3/2013 | Ostrovsky et al. ............ 711/114 |
| 2013/0081060 A1* | 3/2013 | Otenko ..................... 719/314 |
| 2013/0173834 A1* | 7/2013 | Glaser et al. ................. 710/308 |

OTHER PUBLICATIONS

Giacomoni, J.A. "PShm: High-Rate Packet Manipulation in User-Space." Master Thesis, U. of Colorado. 2006.*

Asanovic, K., et al. "The Landscape of Parallel Computing Research: A View From Berkeley." Technical Report UCB/EECS-2006-183, Electrical Engineering and Computer Sciences. Dec. 2006. (56 Pages).

Ha, J., et al. "A Concurrent Dynamic Analysis Framework for Multicore Hardware" Proceeding of the 24th ACM SIGPLAN Conference on Object Oriented Programming Systems Languages and Applications. Oct. 2009. (20 Pages).

Varoglu, S., et al. "Architectural Support for Thread Communications in Multi-Core Processors" Parallel Computing, vol. 37, No. 1. Jan. 2011. pp. 26-41.

Yu, C., et al. "Energy- and Performance-Efficient Communication Framework for Embedded MPSOCS Through Application-Driven Release Consistency" ACM Transactions on Design Automation of Electronic Systems, vol. 16, No. 1, Article 8. Nov. 2010. pp. 1-39.

\* cited by examiner

INTERFACE AND METHOD FOR INTER-THREAD COMMUNICATION

FIELD OF THE INVENTION

The invention relates to an interface and to a method for inter-thread communication between a plurality of threads including a number of producer threads for producing data objects and a number of consumer threads for consuming the produced data objects.

BACKGROUND

In large core systems, it is crucial for software developers to structure their programs to take advantage of the plurality of computational units in the core system. Software not optimized for multi-cores may not improve its performance when running on such core systems.

Crucial for hardware platforms may be the support offer to software developers to rapidly write optimized code benefits from existing and upcoming hardware features.

In particular, one important challenge for software developers is to deal with fine-grained inter-thread communications which may increase cache-coherency overhead, inter-chip communication, the impact of false sharing, the number of thread migrations, and which may saturate specific hardware constructs and limit scalability. This is particularly evident in modern managed languages, e.g. JAVA™, that provide automatic memory management.

Moreover, fine-grained inter-thread communication may reduce the performance of multi-thread applications executed on modern multi-core systems.

In case that two or more threads concurrently execute on different cores and communicate by means of a shared data structure, references to the accessed data have to be moved between the caches of corresponding cores.

On modern architectures, the last-level cache, e.g., L3 cache is conventionally shared between the cores that are part of the same CPU (CPU: Central Processing Unit).

However, this may not be the case for caches at other levels, e.g., L1 and L2, or for cores on different CPUs.

In case of fine-grained communication, the overhead introduced by cache-coherency protocols may severely impact the program execution time.

In this regard, FIG. 10 shows an example for conventional inter-thread communication between producer threads T1-T3 and consumer threads C1-C3. Each thread T1-T3, C1-C3 has an allocated, unshared cache M1-M6.

The producer threads T1-T3 communicate with the consumer threads C1-C3 by means of a shared data structure, embodied by a shared queue SQ in FIG. 10. References to this shared data structure SQ have to be frequently moved between the caches M1-M6 of the cores on which the corresponding threads T1-T3, C1-C3 are executing. This issue is even more evident in case of multiple producers T1-T3 and consumers C1-C3 accessing the same data structure SQ as exemplarily shown in FIG. 10.

Document US 2010/0332755 A1 describes a method and an apparatus for using a shared ring buffer to provide thread synchronization in a mulit-core processor system. Therein, synchronization between threads in a multi-core processor system is provided. Such an apparatus includes a memory, a first processor core, and a second processor core. The memory includes a shared ring buffer for storing data units, and stores a plurality of shared variables associated with accessing the shared ring buffer. The first processor core runs a first thread and has a first cache associated therewith. The first cache stores a first set of local variables associated with the first processor core. The first thread controls insertion of data items into the shared ring buffer using at least one of the shared variables and the first set of local variables. The second processor core runs a second thread and has a second cache associated therewith. The second cache stores a second set of local variables associated with the second processor core. The second thread controls extraction of data items from the shared ring buffer using at least one of the shared variables and the second set of local variables.

Document US 2010/0223431 A1 shows a memory access control system, a memory access control method, and a program thereof. In a multi-core processor of a shared-memory type, deterioration in the data processing capability caused by competitions of memory accesses from a plurality of processors is suppressed effectively. In a memory access controlling system for controlling accesses to a cache memory in a data read-ahead process when the multi core processor of a shared-memory type performs a task including a data read-ahead thread for executing data read-ahead and a parallel execution thread for performing an execution process in parallel with the data read-ahead, the system includes a data read-ahead controller which controls an interval between data read-ahead processes in the data read-ahead thread adaptive to a data flow which varies corresponding to an input value of the parallel process in the parallel execution thread. By controlling the interval between the data read-ahead processes, competitions of memory accesses in the multi-core processor are suppressed.

Document US 2010/0169895 A1 describes the method and system for inter-thread communication using processor messaging. In shared-memory computer systems, threads may communicate with one another using shared memory. A receiving thread may poll a message target location repeatedly to detect the delivery of a message. Such polling may cause excessive cache coherency traffic and/or congestion on various system buses and/or other interconnects. A method for inter-processor communication may reduce such bus traffic by reducing the number of reads performed and/or the number of cache coherency messages necessary to pass messages. The method may include a thread reading the value of a message target location once, and determining that this value has been modified by detecting inter-processor messages, such as cache coherence messages, indicative of such modification. In systems that support transactional memory, a thread may use transactional memory primitives to detect the cache coherence messages. This may be done by starting a transaction, reading the target memory location, and spinning until the transaction is aborted.

Document US 2010/0131720 A1 shows the management of ownership control and data movement in shared-memory systems. It is a method to exchange data in a shared memory system includes the use of a buffer in communication with a producer processor and a consumer processor. The cache data is temporarily stored in the buffer. The method includes for the consumer and the producer to indicate intent to acquire ownership of the buffer. In response to the indication of intent, the producer, consumer, buffer are prepared for the access. If the consumer intends to acquire the buffer, the producer places the cache data into the buffer. If the producer intends to acquire the buffer, the consumer removes the cache data from the buffer. The access to the buffer, however, is delayed until the producer, consumer, and the buffer are prepared.

Document US 2009/0106495 describes a fast inter-strand data communication for processors with write-through L1 caches. Therein, a non-coherent store instruction is used to reduce inter-thread communication latency between threads sharing a level one write-through cache. When a thread executes the non-coherent store instruction, the level one cache is immediately updated with the data value. The data value is immediately available to another thread sharing the level-one write-through cache. A computer system having reduced inter-thread communication latency is disclosed. The computer system includes a first plurality of processor cores, each processor core including a second plurality of processing engines sharing a level one write-through cache. The level one caches are connected to a level two cache via a crossbar switch. The computer system further implements a non-coherent store instruction that updates a data value in the level one cache prior to updating the corresponding data value in the level two cache.

Further, thread-to-thread communication is described in US 2005/0289555 A1. A method for programmer-controlled cache line eviction policy is shown in US 2006/0143396 A1. Further background is described in references [1] and [2].

BRIEF SUMMARY OF THE INVENTION

According to a first aspect, an interface for inter-thread communication between a plurality of threads including a number of producer threads for producing data objects and a number of consumer threads for consuming the produced data objects is suggested. The interface includes a specifier and a provider. The specifier is configured to specify a certain relationship between a certain producer thread of the number of producer threads which is adapted to produce a certain data object and a consumer thread of the number of consumer threads which is adapted to consume the produced certain data object. Further, the provider is configured to provide direct cache line injection of a cache line of the produced certain data object to a cache allocated to the certain consumer thread related to the certain producer thread by the specified certain relationship.

According to some implementations, data from the cache allocated to a producer thread may be directly sent to the cache allocated to the consumer thread of this data.

Thus, the present interface may allow software developers to better exploit modern multi-core hardware, i.e. by cache line injection and particularly also by cache line eviction. Thus, the operating system and the CPU memory module may be adequately modified. Therefore, according to some implementations, cache coherency overhead may be reduced, inter-chip communication may be reduced, the impact of false sharing may be reduced and the number of thread migrations may be reduced. Further, saturation of specific hardware constructs may be avoided and the scalability may be improved. Therefore, the performance level of software using the present interface may be improved. The implementation of the mechanism of the proposed interface may be built on top of existing hardware features.

In an embodiment, the interface is a programming tool, in particular an Application Programming Interface (API).

In a further embodiment, the certain data object is embodied by a number of consecutive cache lines. Then, the provider may be configured to provide direct cache line injection of the number of consecutive cache lines from the cache allocated to the certain producer thread to the cache allocated to the certain consumer thread related to the certain producer thread by the specified certain relationship.

In a further embodiment, the provider is configured to provide direct cache line injection of a cache line of the produced certain data object from a cache allocated to the certain producer thread to a reserved space of the cache allocated to the certain consumer thread. The reserved space may be the top of the cache.

In a further embodiment, the cache allocated to the certain consumer thread is organized by a number of default policies. The default policies may include First-In-First-Out (FIFO) and write-back.

In a further embodiment, the provider is configured to provide direct cache line injection of the cache line of the produced data object to a top line of the certain FIFO cache allocated to the certain consumer thread.

In a further embodiment, the cache allocated to the certain consumer thread is a reserved portion of a cache shared by the plurality of threads or an additional dedicated cache provided for the inter-thread communication.

In a further embodiment, the plurality of threads are configured to be executed on different cores and further configured to communicate by means of a shared-data structure, where data objects are moved from caches allocated to producer threads to caches allocated to consumer threads. Data objects moved from a cache allocated to a producer thread to a cache allocated to a consumer thread may include references to data accessed by the threads and stored in the main memory of the processor.

In a further embodiment, the provider is configured to provide direct cache line eviction of a cache line of a cache allocated to the certain consumer thread in dependence on the specified certain relationship. Here, evicting a cache line includes selectively removing the cache line from the cache.

In a further embodiment, the provider is configured to evict a cache line from the cache allocated to the certain producer thread to a reserved portion of a cache shared by the plurality of threads.

In a further embodiment, the provider is configured to evict all cache lines from the cache allocated to the certain producer thread to a reserved portion of the cache shared by the plurality of threads.

In a further embodiment, the provider is configured to evict a cache line from the cache allocated to the certain producer thread to a reserved portion of a cache shared by the plurality of threads and to inject the cache line from the reserved portion of the cache shared by the plurality of threads to the cache allocated to the certain consumer thread.

In a further embodiment, the provider is configured to evict all cache lines from the cache allocated to the certain producer thread to a reserved portion of the cache shared by the plurality of threads and to inject all the cache lines from the reserved portion of the cache shared by the plurality of threads to the cache allocated to the certain consumer thread.

Any embodiment of the first aspect may be combined with any embodiment of the first aspect to obtain another embodiment of the second aspect.

According to a second aspect, a method for inter-thread communication between a plurality of threads including a number of producer threads for producing data objects and a number of consumer threads for consuming the produced data objects is suggested. The method includes a step of specifying a certain relationship between a certain producer thread of the number of producer threads which is adapted to produce a certain data object and a consumer thread of the number of consumer threads which is adapted to consume the produced certain data object. Moreover, the method includes a step of providing direct cache line injection of a cache line of the produced certain data object to a cache allocated to the certain consumer thread related to the certain producer thread by the specified certain relationship.

According to a third aspect, a computer program is suggested which comprises a program code for executing the method of the above second aspect for inter-thread communication between a plurality of threads when run on at least one computer.

For example, the present interface may be also called Thread Communication API and may be exposed to ease thread communication, at operating system (OS) level:

evict(memoryLocation): evict references to a specific memory location from unshared caches of the core on which the current thread is executing evictAll(memoryLocation): evict references to a specific memory location from all caches of the core on which the current thread is executing. The evicted data will be copied to the main memory inject(memoryLocation, thread): inject a reference to the specified memory location in the cache of the core on which the specified thread is executing sendTo(memoryLocation, thread): in addition to the behavior of the evictAll(memoryLocation) function, copy the evicted data into a reserved cache space and indicate that the data should be accessed by the specified thread receive(memoryLocation): access the reserved cache space and look if data contained in the specified memory location has been sent to the current thread. If so, inject it into the cache, otherwise follow the traditional memory model receiveBlocking(memoryLocation): similar to receive (memoryLocation), but blocks in case requested data is not available in the reserved cache space For example, the present interface may be realized at operating system (OS) level by exposing the interface as an API to access the following CPU cache management instructions: dcbfl and dcbtst. In case of dcbfl, the contents of a modified data cache block are copied to the main storage and the copy of the block is made invalid in the data cache.

In case of dcbtst, a hint is provided that the program will probably soon access a specified data cache block.

Moreover, the operating system may take into account these commands for scheduling purposes.

At hardware level, a specific area of the cache may be reserved to facilitate thread communication. This area may be implemented in two different ways. In a first way, a portion of the shared L3 cache may be reserved. In a second way, a specific, additional cache may be designed and used for this scope.

Further, software developers may use the proposed interface to optimize inter-thread communication in the following ways. First, it may be indicated that a reference to a specific data structure can be evicted from the cache using the evictAll function which triggers a call to the dcbfl instruction of the CPU cache management module. Second, it may be indicated that the reference to a specific data structure can be injected to the cache of the core on which a thread is executing using the inject function, which triggers the call to the dcbtst instruction of the CPU cache management module. Third, it may be indicated that the reference to a specific data structure has to be sent from one thread to another thread using both the sendTo and the receive functions.

In the following, exemplary embodiments of the present invention are described with reference to the enclosed figures.

BRIEF DESCRIPTION OF THE DRAWINGS

Similar or functionally similar elements in the figures have been allocated the same reference signs if not otherwise indicated.

DETAILED DESCRIPTION OF THE EMBODIMENTS

Figure 1:
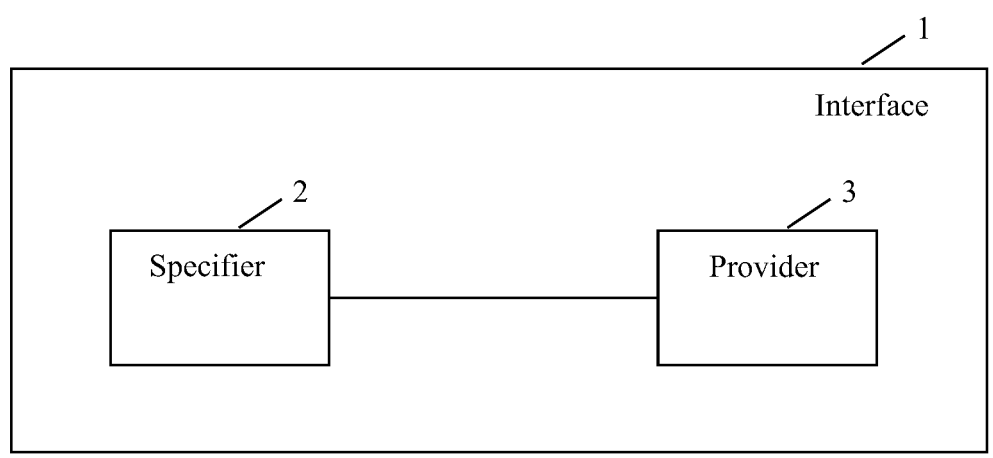
FIG. 1 shows a schematic block diagram of an embodiment of an interface for inter-thread communication.

In FIG. 1, a schematic block diagram of an embodiment of an interface 1 for inter-thread communication is depicted.

Figure 2:
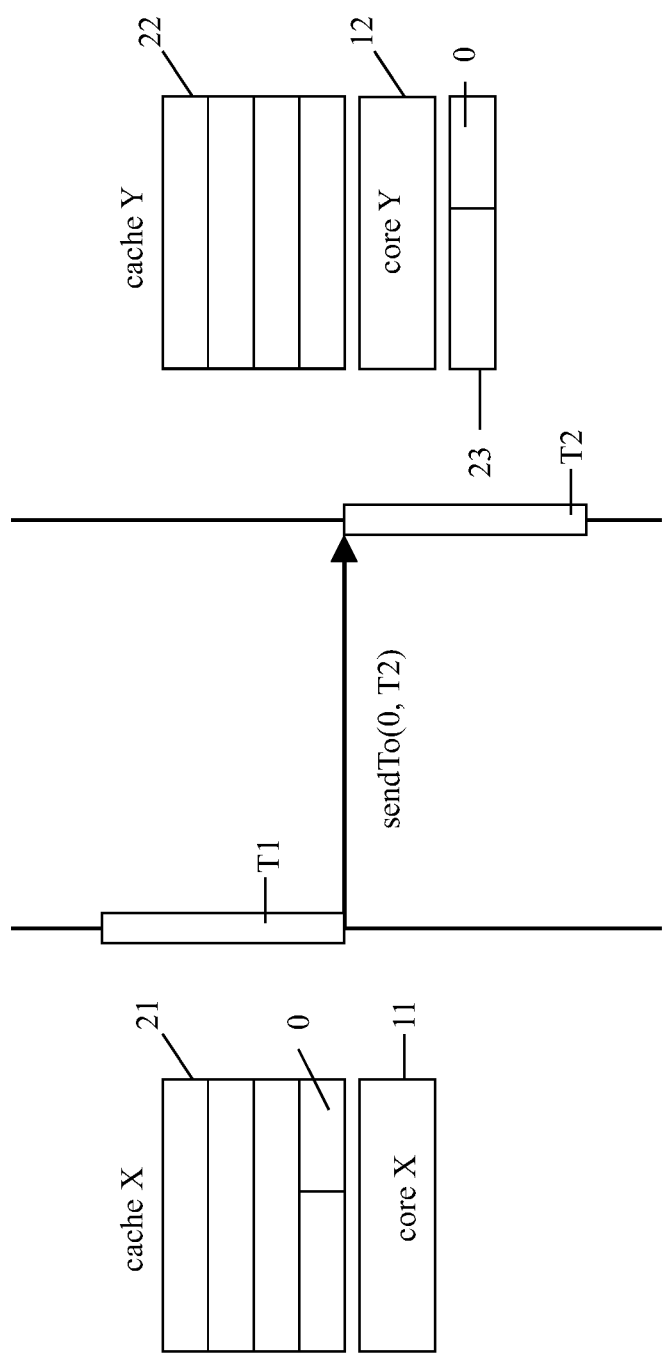
FIGS. 2 and 3 show a first example for inter-thread communication.
Figure 3:
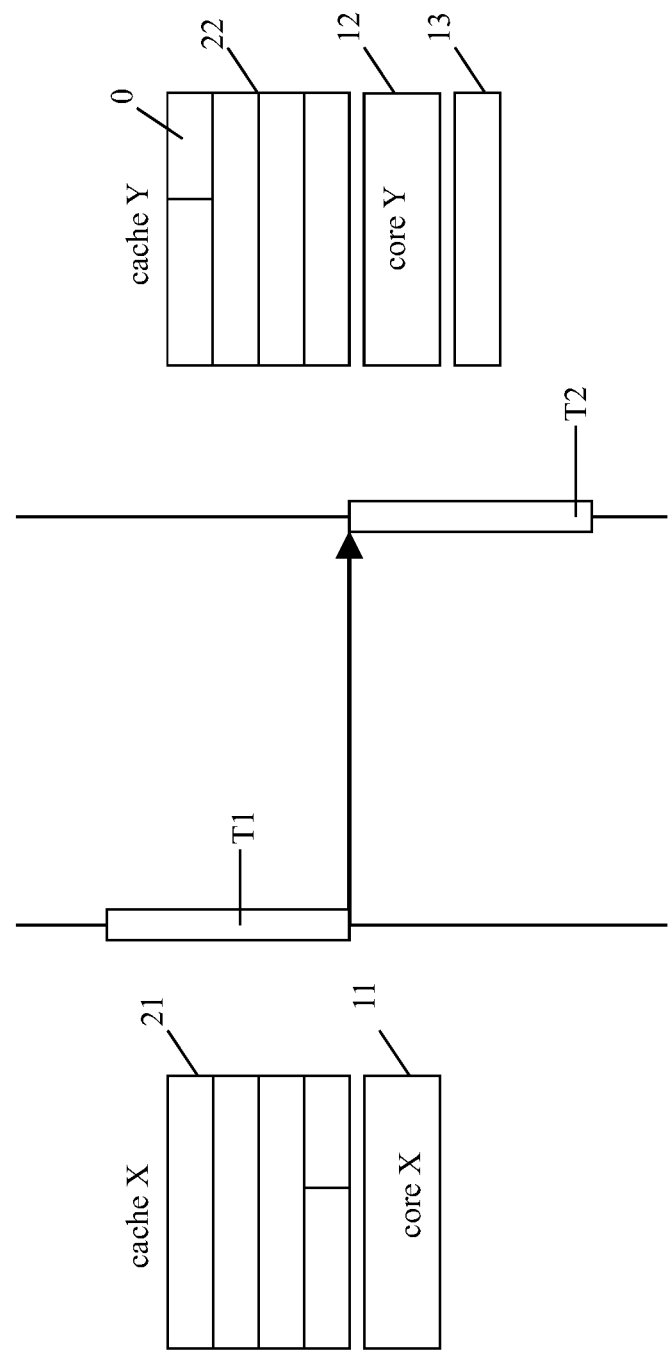

The interface 1 is configured for inter-thread communication between a plurality of threads T1, T2 (see e.g. FIGS. 2 and 3). The plurality of threads T1, T2 includes a number of producer threads T1 for producing data objects O and a number of consumer threads T2 for consuming the produced data objects O.

The interface 1 includes a specifier 2 and a provider 3. The specifier 2 is configured to specify a certain relationship between a certain producer thread T1 of the number of producer threads which is adapted to produce a certain data object O and a consumer thread T2 of the number of consumer threads which is adapted to consume the produced certain data object O. In other words, a certain relationship is specified or determined between the certain producer thread T1 and the certain consumer thread T2, if the producer thread T1 produces a certain data object O which is consumed by the certain consumer thread T2 in the following.

Moreover, the provider 3 is configured to provide direct cache line injection of a cache line of the produced certain data object O to a cache 22 allocated to the certain consumer thread T2 related to the certain producer set T1 by the specified certain relationship (see e.g. FIGS. 2 and 3).

The interface 1 is in particular a programming tool provided for a programmer. For example, the interface 1 is an Application Programming Interface (API).

Figure 4:
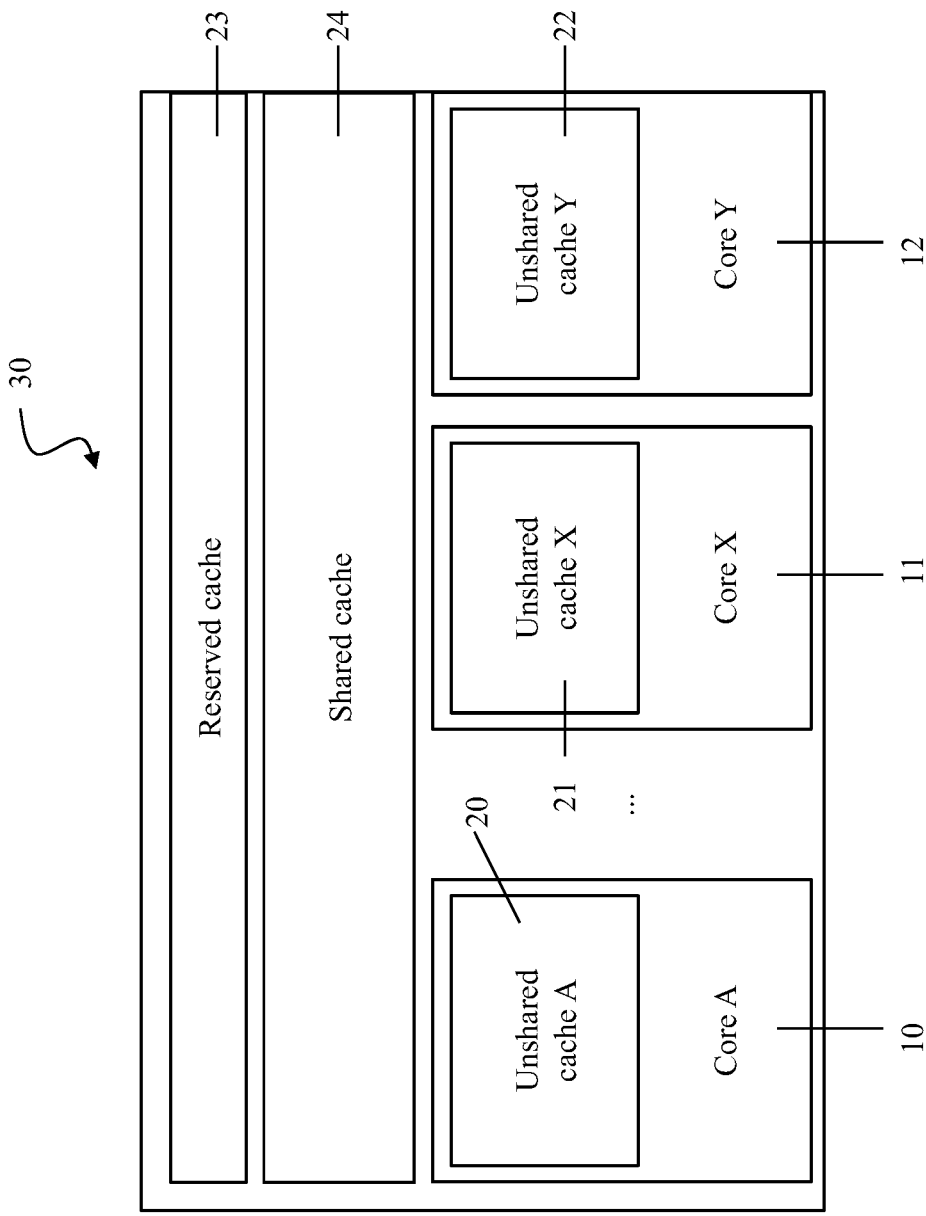
FIGS. 4 to 6 show a second example for inter-thread communication.
Figure 5:
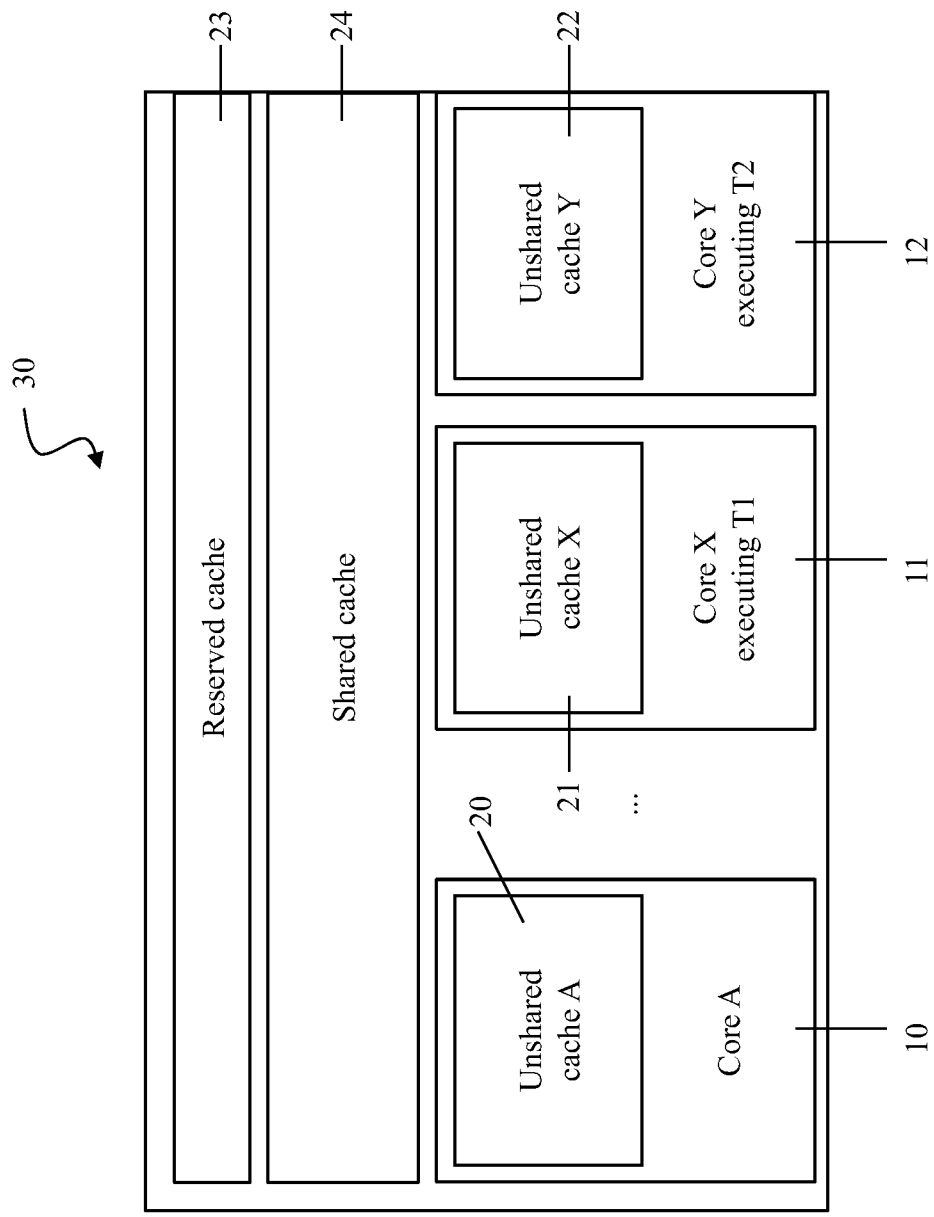
Figure 6:
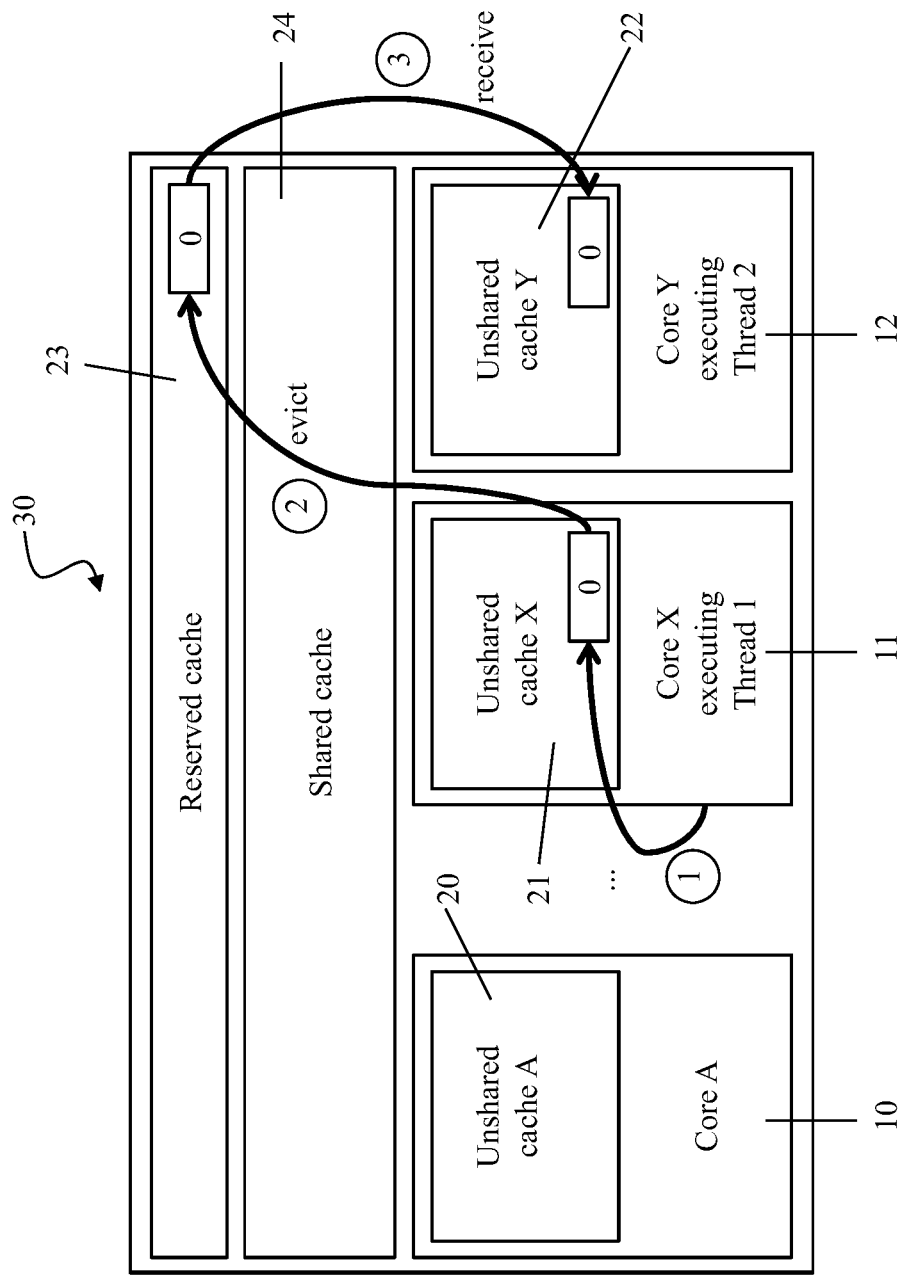

Functions of the interface 1 of FIG. 1 are described with reference to the first example for inter-thread communication of FIGS. 2 and 3 and the second example for inter-thread communication of the FIGS. 4 to 6. In the following, the first and second example for inter-thread communication of FIGS. 2 and 3 and FIGS. 4 to 6 are described in detail. Without loss of generality, the first and second example show only two threads T1, T2, including one producer thread T1 and one consumer thread T2.

For the case that a certain data object O is embodied by a number of consecutive cache lines, the provider 3 may be configured to provide direct cache line injection of the number of consecutive cache lines from the cache 21 allocated to the certain producer thread T1 to the cache 22 allocated to the certain consumer thread T2 related to the certain producer thread T1 by the certain relationship specified by the specifier 2.

Moreover, the provider 3 may be configured to provide direct cache line injection of the cache line of the produced certain data object O from the cache 21 allocated to the certain producer thread T1 to a reserved space of the cache 22 allocated to the certain consumer thread T2. The cache 22 allocated to the certain consumer thread T2 may be organized by a number of default policies, in particular including FIFO and write-back.

In this case, the provider 3 may be configured to provide direct cache line injection of the cache line of the produced data object O to a top line of the certain FIFO cache 22 allocated to the certain consumer thread T2.

Moreover, the plurality of threads T1, T2 may be configured to be executed on different cores 11, 12 (see for example FIG. 4) and may be further configured to communicate by means of a shared-data structure. Therein, data objects O are moved from caches 21 allocated to producer threads T1 to caches 22 allocated to consumer threads T2.

Furthermore, the provider 3 may be configured to provide direct cache line eviction of a cache line of a cache 22 allocated to the certain consumer thread T2 in dependence on the specified certain relationship. In this regard, eviction may mean selectively removing the cache line from the cache 21 allocated to the certain producer thread T1 to the reserved portion 23 of a cache 23, 24 shared by the plurality of threads T1, T2 (see for example FIG. 6).

Further, with reference to FIG. 4, the provider 3 may be configured to evict a cache line from the cache 21 allocated to the certain producer thread T1 to a reserved portion 23 of a cache 23, 24 shared by the plurality of threads T1, T2 and to inject the cache line from the reserved portion 23 of the cache 23, 24 shared by the plurality of threads T1, T2 to the cache 22 allocated to the certain consumer thread T2. In this regard, the provider 3 may be also configured to evict all cache lines from the cache 21 to the reset portion 23 and to inject all these cache lines from the reserved portion 23 to the cache 22 allocated to the certain consumer thread (see for example FIG. 6).

The details of the first example of FIGS. 2 and 3 for inter-thread communication will follow.

In FIGS. 2 and 3, a producer thread T1 is depicted which is executed by a core X 11, wherein a cache X 21 is allocated to the core X 11. Further, in FIGS. 2 and 3, a consumer thread T2 is depicted which is executed on the core Y 12 which has an allocated cache Y 22. Further, a reserved cache Y 23 is shown. In FIG. 2, a reference to a memory location embodied by a data object O is evicted from the cache X 21 and inserted in the reserved cache Y 23 by the command "sendTo" (0, T2) function called by the thread T1. According to FIG. 2, the data object O contained in the reserved cache Y 23 is moved to the cache Y 22 by a certain function called by the consumer thread T2.

The second example for inter-thread communication is depicted in FIGS. 4 to 6. FIGS. 4 to 6 show a computer system 30 having a number of cores, core A 10, core X 11 and core Y 12.

With reference to FIGS. 5 and 6, core X 11 is executing a thread T1 and the core Y 12 is executing a thread T2. Each of the cores 10, 11, 12 has an allocated unshared cache A 20, cache X 21 and cache Y 22. Further, the computer system 30 has a shared cache 23, 24 which includes a reserved cache 23 for inter-thread communication.

The following example comprised of steps 1 to 3 illustrated in FIG. 6 shows the functionality of the present inter-thread communication of FIGS. 4 to 6. In step 1, thread T1, executed on core X 11 produces some data O in its unshared cache X 21.

In step 2, thread T1 knows it doesn't need the produced data O anymore. Therefore, thread T1 uses the present interface which is shown in FIG. 6 by the "evict" command and the "receive" command to evict the data object O from the unshared cache X 21 to the reserved cache 23. In this regard, the operating system may be modified such that the command "evict" is exposed to the users. Further, the hardware of the computer system 30 may be modified such that the data object O is copied to the reserved cache 23 as shown in FIG. 6.

In step 3, thread T2 executed on core Y 12 needs the data object O produced by thread T1 and receives it from the reserved cache 23 by the "receive" command. Therefore, thread T2 uses the interface 1 to provide a hint to the reserved cache 23 that the data object O is to be accessed. Also here, the operating system may be modified such that the "receive" command is exposed to the users and the hardware is modified such that it may search in the reserved cache 23. If data object O is there, as shown in FIG. 6, the data object O is injected into the unshared cache Y 22 of the core Y 12.

Figure 7:
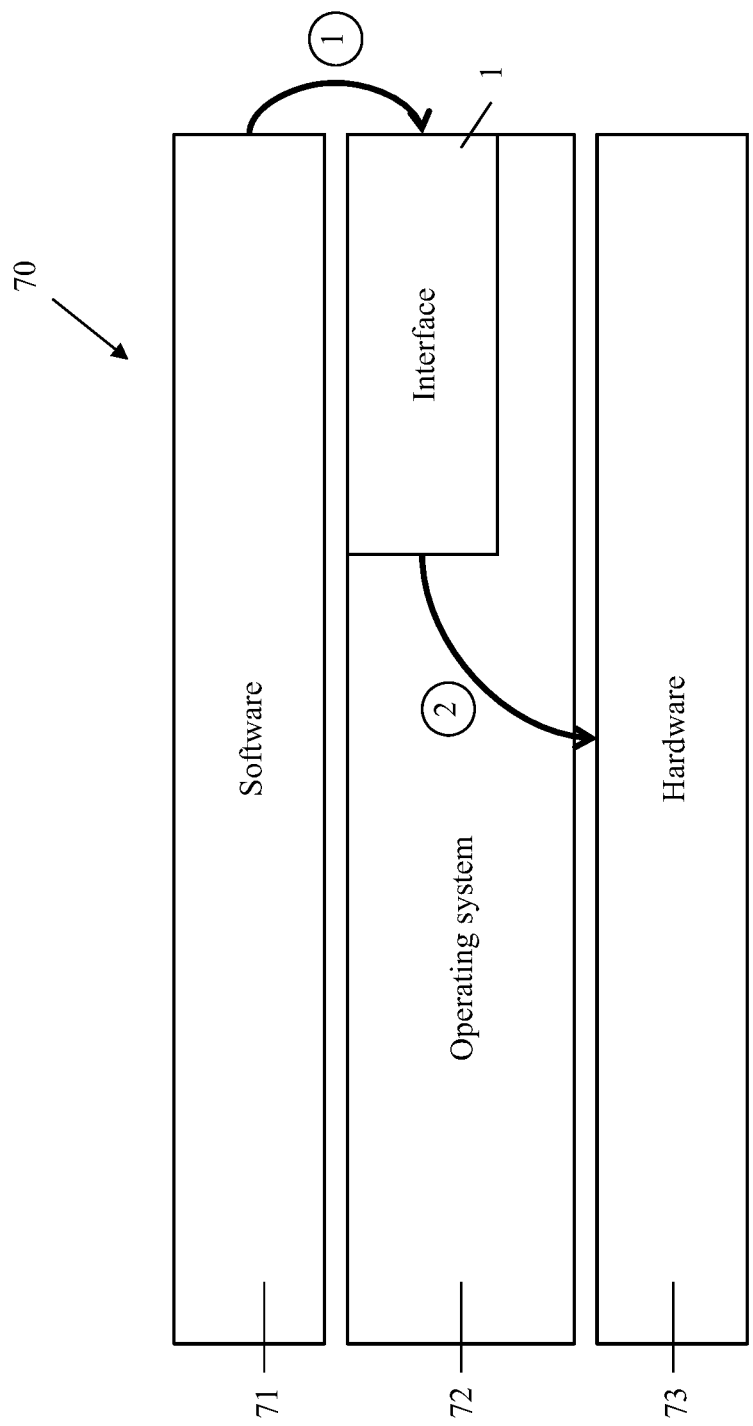
FIG. 7 shows a schematic block diagram of an embodiment of a computer system including an interface for inter-thread communication.

FIG. 7 shows a schematic block diagram of an embodiment of a computer system 70 having software 71, an operating system 72 and hardware 73. The present interface 1 may be part of the operating system 2. In step 1 of FIG. 7, the software 71 may use the interface 1 to enforce specific communication constraints. Further, in step 2, the interface 1 makes use of specific hardware instructions.

Figure 8:
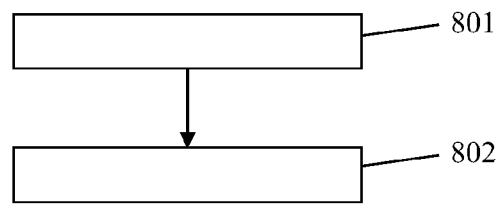
FIG. 8 shows an embodiment of a sequence of method steps for inter-thread communication.

In FIG. 8, an embodiment of a sequence of method steps for inter-thread communication between a plurality of threads including a number of producer threads for producing data objects and a number of consumer threads for consuming the produced data objects is depicted.

In step 801, a certain relationship between a certain producer thread of the number of producer threads which is adapted to produce a certain data object and a consumer thread of the number of consumer threads which is adapted to consume the produced certain data object is specified.

In step 802, a cache line of the produced certain data object is directly injected to a cache allocated to the certain consumer thread related to the certain producer thread by the specified certain relationship.

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 8 may be implemented in software, as an executable program, the latter executed by suitable digital processing devices. More generally, embodiments of the present invention can be implemented wherein general-purpose digital computers, such as personal computers, workstations, etc., are used.

Figure 9:
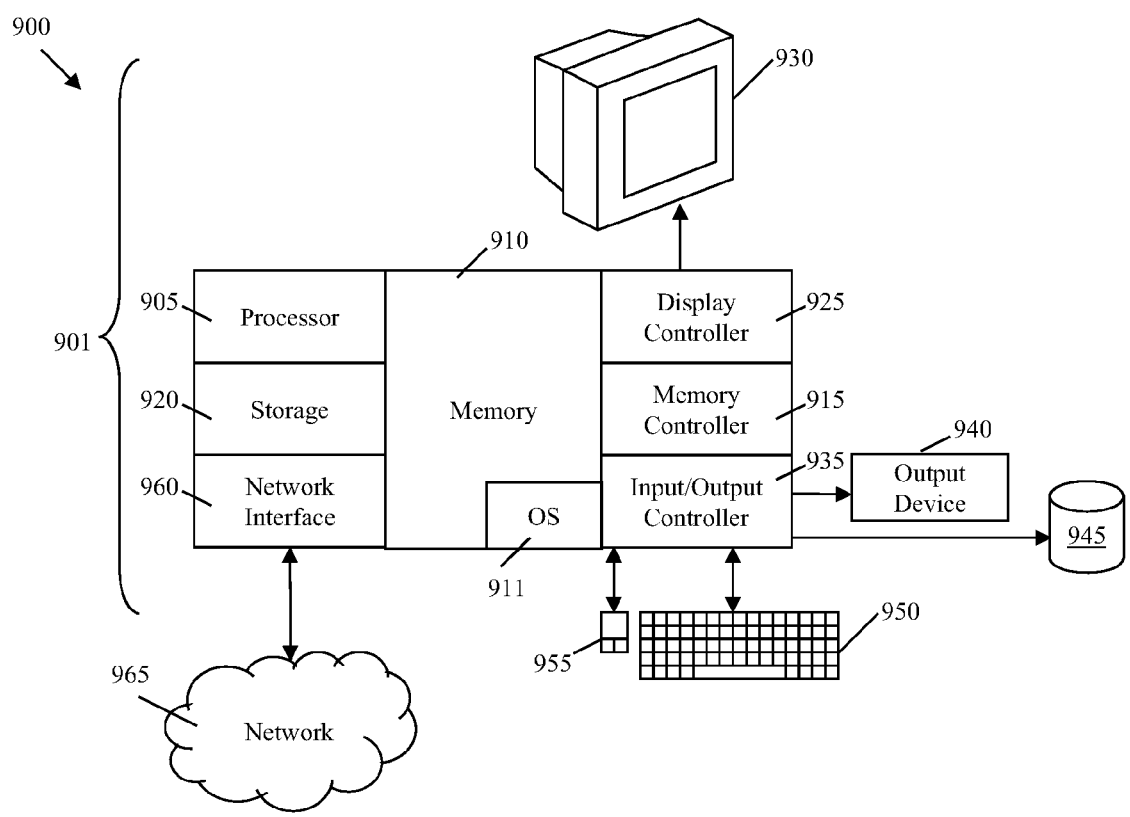
FIG. 9 shows a schematic block diagram of an embodiment of a system adapted for controlling a memory module.
Figure 10:
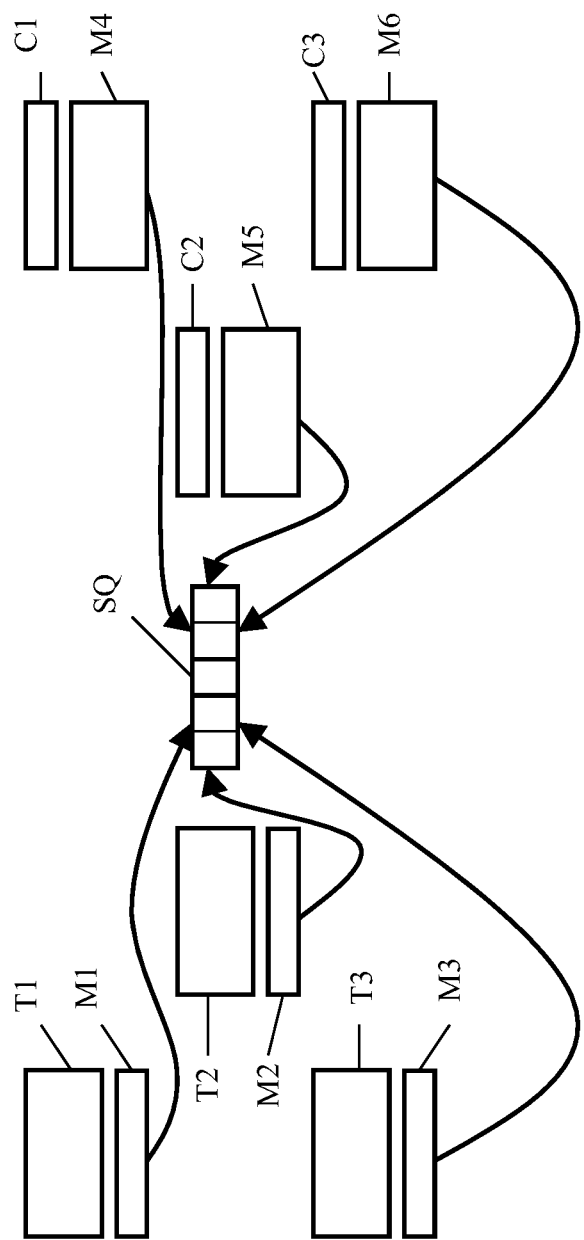
FIG. 10 shows an example for conventional inter-thread communication.

For instance, the system 900 depicted in FIG. 9 schematically represents a computerized unit 901, e.g., a general-purpose computer. In exemplary embodiments, in terms of hardware architecture, as shown in FIG. 9, the unit 901 includes a processor 905, memory 910 coupled to a memory controller 915, and one or more input and/or output (I/O) devices 940, 945, 950, 955 (or peripherals) that are communicatively coupled via a local input/output controller 935. The input/output controller 935 can be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 can be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 can include any one or combination of volatile memory elements (e.g., random access memory) and nonvolatile memory elements. Moreover, the memory 910 may incorporate electronic, magnetic, optical, and/or other types of storage media. Note that the memory 910 can have a distributed architecture, where various components are situated remote from one another, but can be accessed by the processor 905.

The software in memory 910 may include one or more separate programs, each of which comprises an ordered listing of executable instructions for implementing logical functions. In the example of FIG. 9, the software in the memory 910 includes methods described herein in accordance with exemplary embodiments and a suitable operating system (OS) 911. The OS 911 essentially controls the execution of other computer programs, such as the methods as described herein (e.g., FIG. 8), and provides scheduling, input-output control, file and data management, memory management, and communication control and related services. For example, the interface 1 may be embodied in the OS 911.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods can be written as an object oriented programming language, which has classes of data and methods, or a procedure programming language, which has routines, subroutines, and/or functions.

Possibly, a conventional keyboard 950 and mouse 955 can be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 can further include a display controller 925 coupled to a display 930. In exemplary embodiments, the system 900 can further include a network interface or transceiver 960 for coupling to a network 965.

The network 965 transmits and receives data between the unit 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 can also be an IP-based network for communication between the unit 901 and any external server, client and the like via a broadband connection. In exemplary embodiments, network 965 can be a managed IP network administered by a service provider. Besides, the network 965 can be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS can be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g. with reference to FIG. 7 or 8) are implemented in software, the methods can be stored on any computer readable medium, such as storage 920, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCES

[1] Krste Asanovic, Ras Bodik, Bryan C. Catanzaro, Joseph J. Gebis, Parry Husbands, Kurt Keutzer, David A. Patterson, William L. Plishker, John Shalf, Samuel W. Williams, and Katherine A. Yelick. The landscape of parallel computing research: a view from berkeley. Technical Report UCB/EECS-2006-183, Electrical Engineering and Computer Sciences, University of California at Berkeley, December 2006

[2] Ha, J., Arnold, M., Blackburn, S. M., and McKinley, K. S. 2009. A concurrent dynamic analysis framework for multicore hardware. In Proceeding of the 24th ACM SIGPLAN Conference on Object Oriented Programming Systems Languages and Applications (Orlando, Fla., USA, Oct. 25-29, 2009). OOPSLA '09. ACM, New York, N.Y., 155-174. DOI=http://doi.acm.org/10.1145/1640089.1640101

The invention claimed is:

1. A method for providing an interface for inter-thread communication between a plurality of threads including a number of producer threads producing data objects and a number of consumer threads consuming the produced data objects, the method comprising:
specifying a certain relationship between a certain producer thread of the number of producer threads which is adapted to produce a certain data object and a certain consumer thread of the number of consumer threads which is adapted to consume a produced certain data object; and
providing direct cache line injection of a cache line of the produced certain data object to a cache allocated to the certain consumer thread related to the certain producer thread by the specified certain relationship,
wherein said providing step provides direct cache line eviction of a cache line of a cache allocated to the certain consumer thread in dependence on the specified certain relationship.

2. The method of claim 1, wherein the interface is a programming tool, including an Application Programming Interface (API).

3. The method of claim 1, wherein the certain data object is embodied by a number of consecutive cache lines, wherein said providing step provides direct cache line injection of the number of consecutive cache lines from a cache allocated to the certain producer thread to the cache allocated to the certain consumer thread related to the certain producer thread by the specified certain relationship.

4. The method of claim 1, wherein said providing step provides direct cache line injection of a cache line of the produced certain data object from a cache allocated to the certain producer thread to a reserved space of the cache allocated to the certain consumer thread.

5. The method of claim 1, wherein the cache allocated to the certain consumer thread is organized by a number of default policies including First-In-First-Out (FIFO) and write-back.

6. The method of claim 5, wherein said providing step provides direct cache line injection of the cache line of the produced data object to a top line of the cache allocated to the certain consumer thread.

7. The method of claim 1, wherein the cache allocated to the certain consumer thread is a reserved portion of a cache shared by the plurality of threads or an additional dedicated cache provided for the inter-thread communication.

8. The method of claim 1, wherein the plurality of threads are configured to be executed on different cores and further configured to communicate by means of a shared-data structure, where data objects are moved from caches allocated to the producer threads to caches allocated to the consumer threads.

9. The method of claim 1, wherein said providing step evicts a cache line from the cache allocated to the certain producer thread to a reserved portion of a cache shared by the plurality of threads.

10. The method of claim 1, wherein said providing step evicts all cache lines from the cache allocated to the certain producer thread to a reserved portion of the cache shared by the plurality of threads.

11. The method of claim 1, wherein said providing step evicts a cache line from the cache allocated to the certain producer thread to a reserved portion of a cache shared by the plurality of threads and injects the cache line from the reserved portion of the cache shared by the plurality of threads to the cache allocated to the certain consumer thread.

12. The method of claim 11, wherein said providing step evicts all cache lines from the cache allocated to the certain producer thread to a reserved portion of the cache shared by the plurality of threads and injects all the cache lines from the reserved portion of the cache shared by the plurality of threads to the cache allocated to the certain consumer thread.

13. A non-transitory article of manufacture tangibly embodying a computer readable program which when executed causes a computer to perform the steps of claim 1.

* * * * *